(12) United States Patent
Miller

(10) Patent No.: US 7,264,429 B2
(45) Date of Patent: Sep. 4, 2007

(54) TOOL FREE COLLET ASSEMBLY

(75) Inventor: Mark D. Miller, Airville, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/234,760

(22) Filed: Sep. 23, 2005

(65) Prior Publication Data

US 2006/0071433 A1    Apr. 6, 2006

Related U.S. Application Data

(60) Provisional application No. 60/612,773, filed on Sep. 24, 2004.

(51) Int. Cl.
*B23B 31/103* (2006.01)
*B23B 31/20* (2006.01)

(52) U.S. Cl. .................... 409/182; 279/35; 279/42; 279/52; 144/136.95; 144/154.5

(58) Field of Classification Search ............... 279/35, 279/42, 52, 48, 134, 147, 148, 150; 409/181, 409/182; 144/154.5, 136.95
See application file for complete search history.

(56) References Cited

U.S. PATENT DOCUMENTS

| 425,224 | A | * | 4/1890 | Hartness | 279/57 |
|---|---|---|---|---|---|
| 1,952,109 | A | * | 3/1934 | Woodward | 279/49 |
| 3,035,845 | A | * | 5/1962 | Benjamin | 279/47 |
| 5,496,139 | A | | 3/1996 | Ghode et al. | |
| 5,810,366 | A | * | 9/1998 | Montjoy et al. | 279/43 |
| 5,813,805 | A | | 9/1998 | Kopras | |
| 5,944,327 | A | * | 8/1999 | Kanaan | 279/51 |
| 5,997,225 | A | * | 12/1999 | Young et al. | 409/182 |
| 6,045,306 | A | * | 4/2000 | Buddendeck et al. | 409/182 |
| 6,079,916 | A | * | 6/2000 | Grayson et al. | 409/182 |
| 6,079,917 | A | * | 6/2000 | Miksa et al. | 409/182 |
| 6,179,512 | B1 | * | 1/2001 | Gibson et al. | 403/374.1 |
| 6,224,305 | B1 | * | 5/2001 | Huggins | 409/182 |
| 6,244,797 | B1 | * | 6/2001 | Wheeler | 409/182 |
| 6,350,087 | B1 | | 2/2002 | Berry et al. | |
| 6,648,567 | B2 | | 11/2003 | Berry et al. | |
| 6,913,429 | B1 | * | 7/2005 | Phillips et al. | 409/182 |
| 6,932,357 | B2 | * | 8/2005 | Jacobs et al. | 279/42 |
| 2006/0018727 | A1 | * | 1/2006 | Lui | 409/182 |

* cited by examiner

*Primary Examiner*—Monica Carter
*Assistant Examiner*—Michael W. Talbot
(74) *Attorney, Agent, or Firm*—Harness, Dickey & Pierce, P.L.C.

(57) ABSTRACT

A collet assembly, for selectively attaching a tool accessory to a tool, having a collet nut rotatably connectable to the tool, a collet compressible by the collet nut, and a torque application feature movably connected with the tool. The torque application feature is cammingly actuated to engage the collet nut for compressing and loosening the collet.

14 Claims, 6 Drawing Sheets

TOOL FREE COLLET ASSEMBLY

CROSS-REFERENCE TO RELATED APPLICATIONS

This application claims the benefit of U.S. Provisional Application No. 60/612,773, filed on Sep. 24, 2004. The disclosure of the above application is incorporated herein by reference.

FIELD OF THE INVENTION

The present invention relates to generally to the field of power tools. In particular, the present invention relates to a tool-free collet assembly for gripping interchangeable tool accessories, such as drill bits.

BACKGROUND OF THE INVENTION

Various types of tools require a user to selectively attach a tool accessory such as a drill or router bit. Over the course of a particular project or work period it may be necessary to employ a variety of such accessories and to replace worn or broken ones. Convenient removal and replacement of the interchangeable tool accessories is therefore desirable. Two commonly employed mechanisms for holding interchangeable accessories are chucks and collets. Collet type mechanisms are usually favored for tools with higher rotational speeds.

In a collet-type holder, the shank of a tool accessory is inserted into the bore of a collet. A collet is a generally cylindrical element with a longitudinal bore. The collet has at least one end with a plurality of longitudinally extending arcuate jaws arranged equiangularly around the circumference of the collet and spaced apart by a plurality of longitudinally extending cuts. The collet may be machined into the end of a tool output element (such as a shaft, spindle, or arbor) or it may be a separate (sometimes barrel-shaped) element.

A collet nut or collet ring is installed over the collet. The collet nut is threaded onto the end of the tool shaft or spindle. Threading the collet nut down on the spindle causes surfaces on the inside of the collet nut and/or shaft to compress the jaws of the collet around the shank of the tool accessory. Thereby securing the tool accessory to the power tool shaft/spindle.

When changing accessory tools, the nut must be loosened to allow the collet to expand and release its grip on the tool accessory. The tightening and loosening of the collet nut may be partially performed by hand, but the size and shape of the collet nut make it difficult and/or uncomfortable to properly tighten and then initially loosen the collet nut using hands alone. Therefore, it is often necessary to use a hand wrench or similar tool in order to apply sufficient torque to the collet nut.

In the case of rotary or power tools, when tightening or loosening the collet nut, the shaft/spindle must be prevented from rotating or else it would be difficult to achieve relative motion between the nut and the rotatable spindle.

Conventionally, the loosening and tightening process requires that the operator simultaneously grip both the shaft/spindle and the collet nut with two separate hand wrenches or the like. A torque is then applied to the nut while the shaft is held in place. This is an awkward process, made even more so by the necessity to support the weight of the tool itself during the process.

More recently, tools have been designed that incorporate a locking mechanism that locks the shaft/spindle relative to the tool housing. Thus, the rotation of the shaft can be prevented, simply by employing the built in shaft lock. For such a power tool, only one hand wrench is required to loosen or tighten the collet nut, as seen in U.S. Pat. Nos. 5,496,139 and 5,813,805.

The need to use even one hand tool to change tool accessories, however, is still inconvenient. For example, when a bit replacement is required, the tool operator has to stop what he is doing to find a wrench. This delay can be meaningful in jobs, such as drywall installation during major construction or remodeling projects, where high production rates are essential.

SUMMARY OF THE INVENTION

According to the principles of the present invention, a collet assembly for a tool is provided having an advantageous construction and method of using the same. The collet assembly comprises a collet nut rotatably connectable to the tool, a collet compressible by the collet nut, and a torque application feature movably connected with the tool. The torque application feature is cammingly actuated to engage the collet nut for compressing and loosening the collet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

The present invention provides a tool-free collet assembly for a tool. Generally, the present invention is adapted for use in tools such as described in commonly-assigned U.S. Pat. Nos. 6,350,087 and 6,648,567. The disclosure of these patents is incorporated herein by reference.

While shown through the drawings in various embodiments of a rotary cutout tool, those skilled in the art will appreciate that the invention is not so limited in scope. In this regard, the teachings of the present invention will be understood to be readily adaptable for use in any tool incorporating a collet assembly for holding a tool accessory (e.g. bit, driver, etc.).

Figure 1:
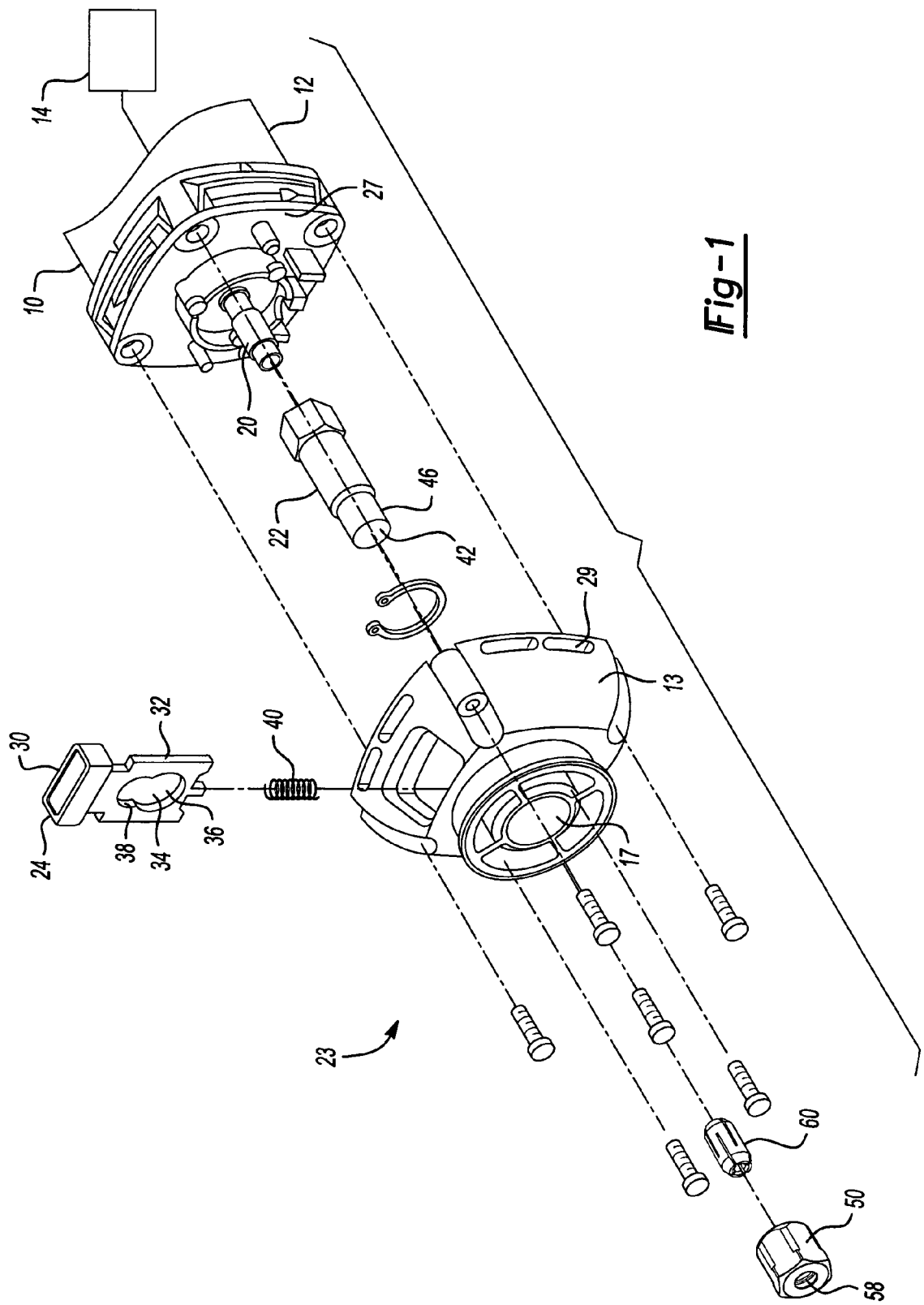
FIG. 1 is an exploded view of a power tool incorporating a tool free collet assembly in accordance with the present invention.

Turning generally to the drawings in which identical or equivalent elements have been denoted with like reference numerals, and particularly to FIG. 1, a power tool is illustrated and designated with the reference numeral 10. The particular power tool shown is, for example, a rotary cutout or router tool including a housing 12. Within the housing 12 is a motor 14 with a cooling fan (not shown). A power source is connected to the motor 14, such as an electrical power cord (not shown) via a switch or a battery assembly. An output member, such as a motor shaft 20, is coupled to the motor 14 and further directly coupled to a spindle 22, so that the accessory (not shown) rotates at motor speed. Alternatively, gearing such as is well known in the art could be located at the motor output in order to turn the tool accessory at a speed different from that of the motor. Motor shaft 20 is supported by bearings (not shown) in a bearing plate 27 mounted in a front housing shroud 13. Connected to the front end of the motor shaft 20 is a spindle 22. Also located in the front housing shroud 13 is a spindle lock mechanism 24 that locks the spindle/shaft against rotation when installing or removing an accessory (not shown). A spindle lock button 30 in the front housing shroud 13 is connected to a spindle lock plate 32. The spindle lock plate 32 has a cutout 34 through which the spindle 22 passes. The cutout 34 in the spindle lock plate 32 has two portions. The first portion 36 is sized to permit the spindle 22 to freely rotate within it during normal operation of the power tool 10. The second portion 38 is shaped to contact the spindle 22 and prevent its rotation. Thus, the spindle lock plate 32 has a locked and an unlocked position corresponding to the two portions 36 and 38 of the cutout 34. A spring 40 biases the spindle lock plate 32 and button 30 radially upward into the unlocked position.

The spindle 22 extends through an opening 17 in the front housing shroud 13. The forward end of the spindle has a bore 42. The spindle bore 42 defines a portion that tapers axially forwardly and radially outwardly. The forward outer surface 46 of the spindle 22 is threaded.

Figure 2:
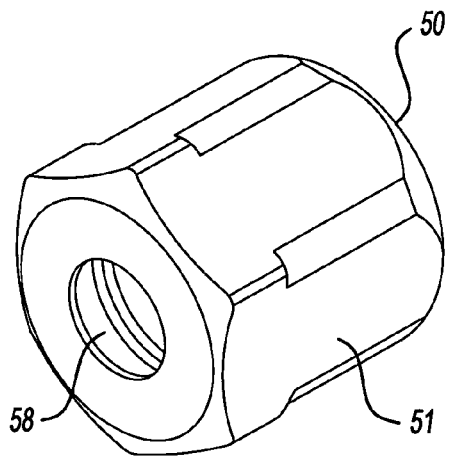
FIG. 2 is a perspective view of the collet nut of FIG. 1.
Figure 3:
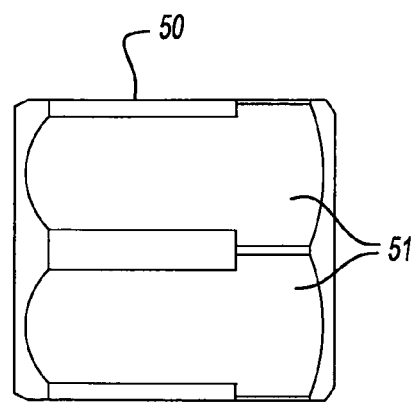
FIG. 3 is a side view of the collet nut of FIG. 2.
Figure 4:
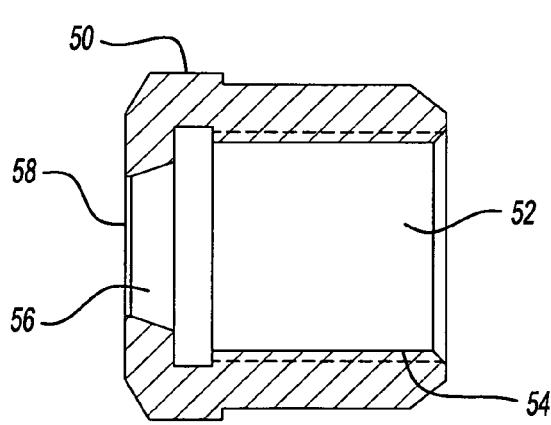
FIG. 4 is a cross-section view of the collet nut of FIG. 2.

A collet nut 50 is threaded onto the threads 46 of the spindle 22. As illustrated in FIGS. 2-4, the collet nut 50 has a multifaceted exterior surface 51 for being gripped in a manner in accordance with the principles of the present invention to be described below. The collet nut 50 has a longitudinal bore 52 having two portions. The rearward portion 54 is sized and threaded to mechanically engage the exterior threads on the forward outer surface 46 of the spindle 22. The forward portion 56 of the bore 52 tapers axially forwardly and radially inwardly to an opening 58 in the front face of the collet nut 50.

Figure 5:
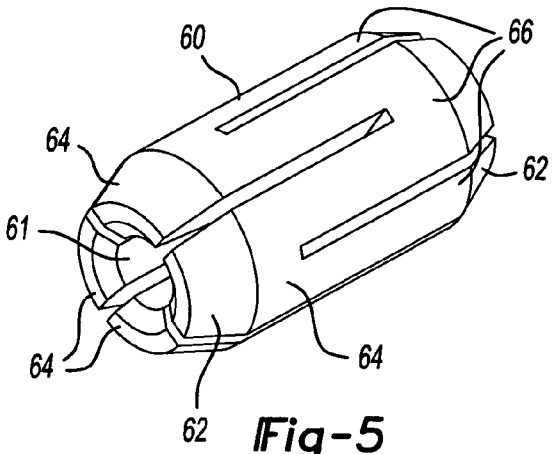
FIG. 5 is a perspective view of the collet of FIG. 1.

A collet 60 is suitably sized and shaped to be captured within and between the forward end of the spindle bore 42 and the collet nut 50. As illustrated in FIG. 5, the collet 60 is generally tubular in shape with an axial bore 61 and conical ends 62 that taper radially inward toward the ends of the collet. Additionally, the collet 60 is axially split into a plurality of front cantilevered jaws 64 and a plurality of rear cantilevered jaws 66.

When the collet 60 is installed within and between the spindle 22 and the collet nut 50, the tapered outer surfaces 62 contact the tapered surfaces in the spindle bore 42 and the tapered surfaces 56 in the collet nut 50. As the collet nut 50 is tightened onto the spindle 22, the tapered surfaces 56 of the collet nut 50 and the tapered surfaces of the spindle bore 42 exert a compression force against the conical tapered surfaces 62 of the collet 60. This force compresses the cantilevered jaws 64 and 66 of the collet 60 radially inward to grip the shank of the accessory (not shown). Conversely, when the collet nut 50 is backed off the spindle 22, the forces exerted by the tapered surfaces and 56 on the cantilevered jaws 64 and 66 are reduced and the jaws expand releasing the shank of the accessory (not shown).

To accommodate tool accessories with shanks of various diameters, such as the commonly available ⅛ inch and ¼ inch diameter sizes, collets 60 with bores 61 of the appropriate internal diameter may be substituted for each other. In order that the interchangeable collets 60 effectively cooperate with the common collet nut 50 and spindle 22, as described above, the interchangeable collets have substantially identical external geometries and dimensions as regards collet parts 62, 64 and 66.

Figure 6:
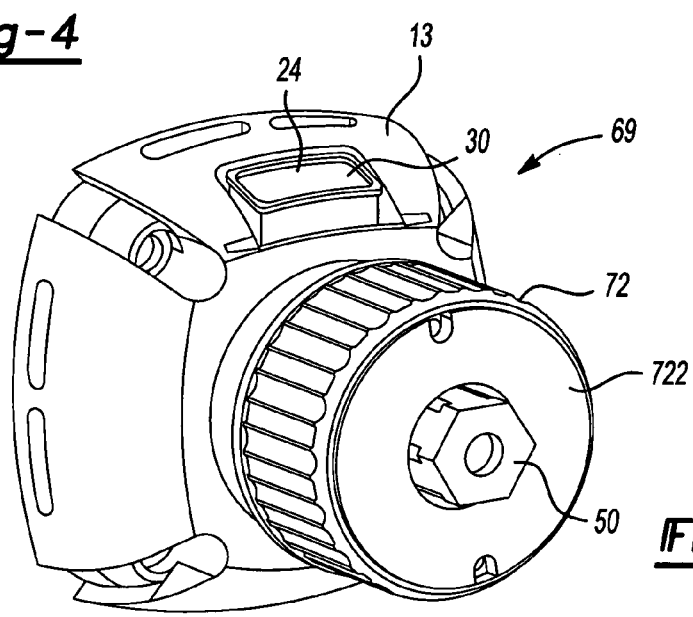
FIG. 6 is a perspective view of an assembled tool free collet assembly.
Figure 7:
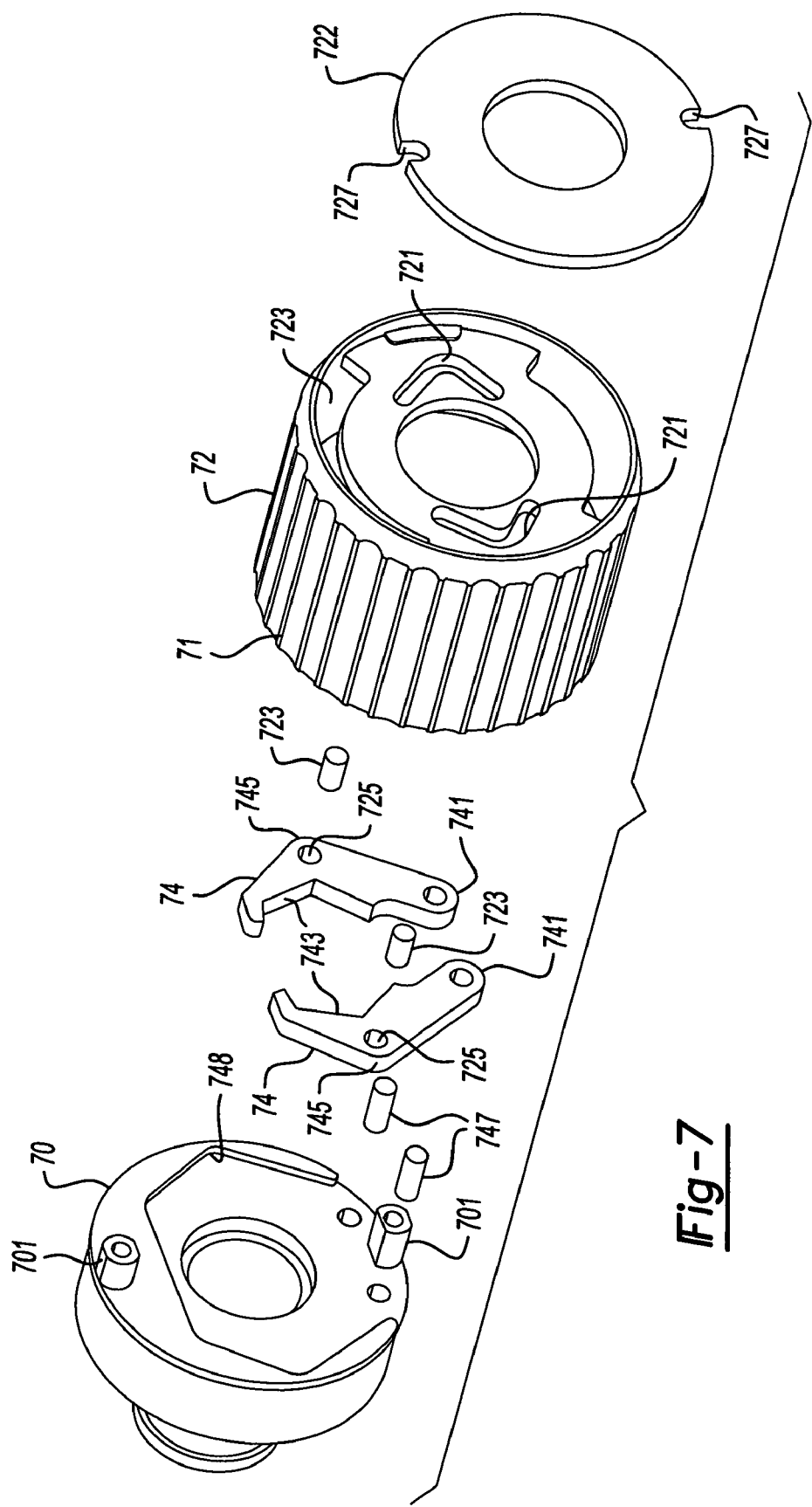
FIG. 7 is an exploded view of various component of the tool free collet assembly of FIG. 6.

As best seen in FIGS. 6 and 7, the collet 60 and collet nut 50 are partly enclosed within a collet grip assembly 69 having a collet grip base 70, a twist collar 72, and a pair of collet wrench plates 74. The collet grip base 70 is a generally cylindrical structure rotatably mounted on the front housing shroud 13 and does not rotate with the shaft 20 and spindle 22 during normal tool operation.

As best seen in FIG. 7, the pair of collet wrench plates 74 are each shaped having a pivot end 741, a gripping portion 743, and a cam portion 745. Pivot end 741 of each collet wrench plate 74 is pivotally coupled to collet grip base 70 via a pivot pin 747 to pivot thereabout and are further received within a depression 748 formed in collet grip base 70. The pair of collet wrench plates 74 are pivotable between a disengaged position (see FIG. 8) that permits the free rotation of collet nut 50 during normal operation, a collet loosening position (see FIG. 9), and a collet tightening position (see FIG. 10). The pair of collet wrench plates 74 are indirectly biased in the disengaged position via a pair of collet wrench springs 749 (see FIGS. 8-10). The gripping portion 743 on each of the pair of collet wrench plates 74 is sized and shaped to engage the exterior faces 51 of the collet nut 50.

Still referring to FIG. 7, the twist collar 72 is of sufficient diameter and may be provided with a textured surface collet grip 71 to provide a comfortable hold that will aid the operator in exerting sufficient torque to tighten or loosen the collet nut 50. A collet grip cover 722 is used to retain the twist collar 72 to collet grip base 70, yet permit the relative rotation between the twist collar 72 and collet grip base 70. The collet grip cover 722 is fastened to collet grip base 70 via fasteners disposed through holes 727 and received in mounts 701, thereby capturing the twist collar 72 therebetween. The twist collar 72 includes a pair of cams 721 and a collet wrench spring receiving portion 723. Each of the pair of cams 721 is sized to receive a corresponding cam pin 723, which is fixedly mounted within apertures 725 formed in cam portion 745 of each wrench plate 74. Each of the pair of cams 721 are further shaped to pivotally drive each of the wrench plates 74 about pivot pins 747 between the disengaged position, the collet loosening position, and the collet tightening position as twist collar 72 is rotated relative to collet grip base 70.

Figure 8:
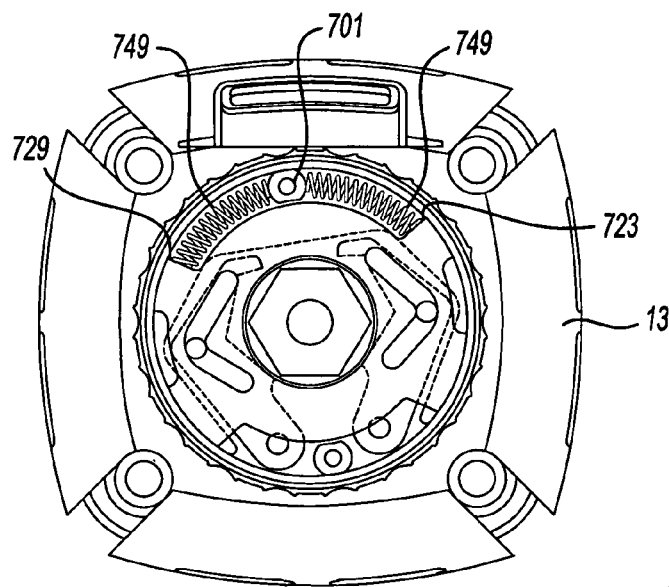
FIG. 8 is a schematic front view of the tool free collet assembly of FIG. 6 in a disengaged position.
Figure 9:
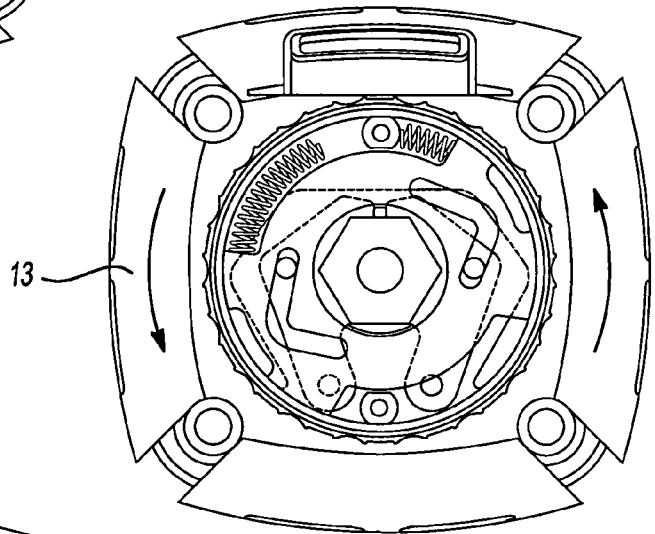
FIG. 9 is a schematic front view of the tool free collet assembly of FIG. 6 in a collet loosening position.
Figure 10:
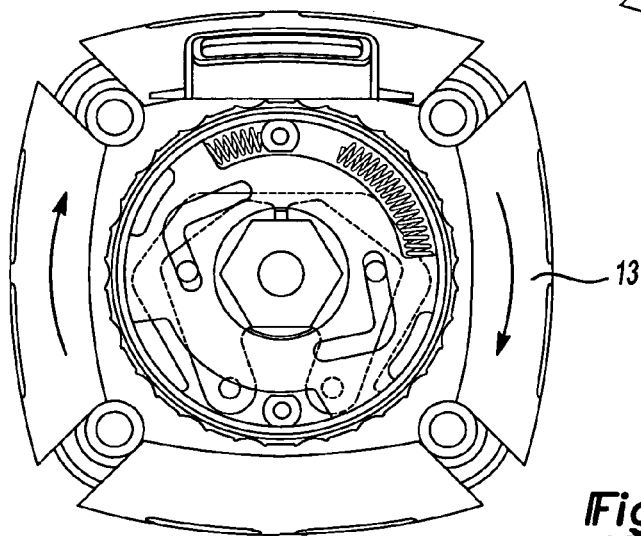
FIG. 10 is a schematic front view of the tool free collet assembly of FIG. 6 in a collet tightening position.

Finally, as seen in FIGS. 8-10, the pair of collet wrench springs 749 are disposed in the collet wrench spring receiving portion 723 of twist collar 72, such that each engages a wall 729 formed in the twist collar 72 on one end and a side of mount 701 on the other end. This arrangement serves to center the twist collar 72 relative to collet grip base 70 and thus return the pair of wrench plates 74 to their disengaged position.

To tighten or loosen the collet 60 around the shank of an accessory (not shown) the operator first locks the spindle 22 against rotation by depressing and holding the spindle lock button 30. This compresses the spring 40 and brings the second portion 38 of the cutout 34 in the spindle lock plate 32 into contact with the spindle 22.

With the other hand, the operator then grasps the twist collar 72 and rotates the twist collar against the biasing force of one of the pair of collet wrench springs 749. It should be noted that the collet grip base 70 is more resistant to rotation than the twist collar 72. This causes the cam pins 723 to cam within the cams 721, thereby causing the wrench plates 74 to pivot about the pivot pins 747 and engage the exterior surface 51 of the collet nut 50.

The operator can then continues rotating the twist collar 72, thereby causing the collet grip base 70 and the wrench plates 74 to either tighten or loosen the collet nut 50 and compress or release the collet 60. The collet nut 50 may extend partially beyond the collet grip cover 722 through an opening. The exposed end of the collet nut 50 can then be conveniently finger tightened or loosened before or after applying significant torque with the tool free collet assembly 23 and the bit inserted or removed. In order to reduce the torque required to firmly hold the shank of the tool accessory, the collet nut 50 and/or the spindle 22 on which it is threaded may be coated with a non-stick material such as TEFLON.

Figure 11:
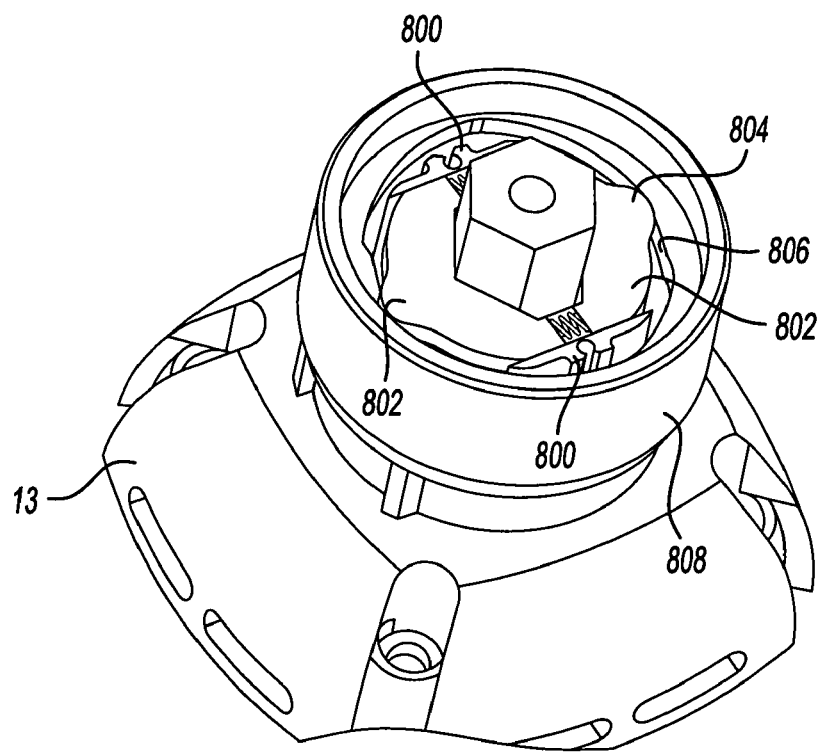
FIG. 11 is a perspective view of an alternate tool free collet assembly in a collet loosening/tightening position.
Figure 12:
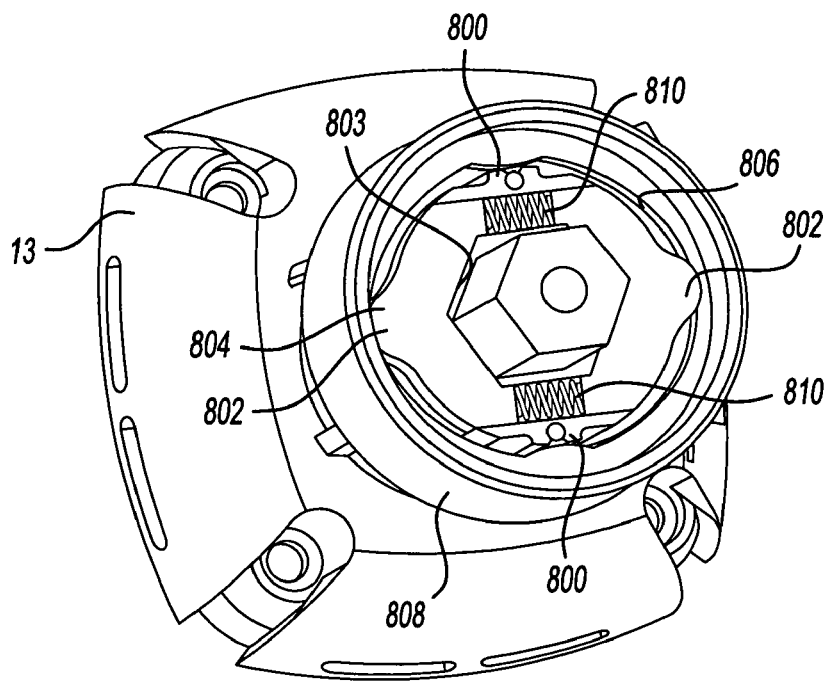
FIG. 12 is a perspective view of the alternate tool free collet assembly of FIG. 11 in a collet disengaged position.

As seen in FIGS. 11 and 12, an alternative embodiment is illustrated wherein the collet grip base 70 includes a pair of opposing wall structures 800. A pair of slidable wrench plates 802 is slidably disposed between the opposing wall structures 800 of the collet grip base 70. Each of the pair of slidable wrench plates 802 includes a gripping portion 803 and cam follower 804 and is movable between a disengaged position (see FIG. 12) and an engaged position (see FIG. 11). The pair of cam followers 804 engages a cam 806 formed on the interior of twist collar 808, such that the pair of slidable wrench plates 802 can be moved from the disengaged position to the engaged position in response to twisting of the twist collar 808. A pair of springs 810 is disposed between the pair of slidable wrench plates 802 to bias the pair of slidable wrench plates 802 into the disengaged position.

Figure 13:
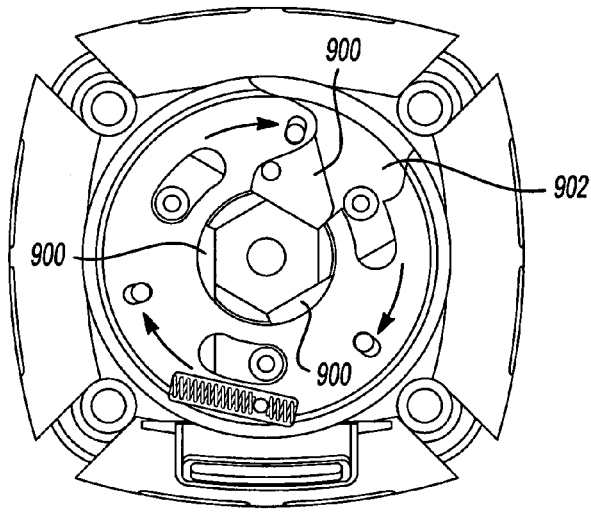
FIG. 13 is a schematic front view of another alternate tool free collet assembly in a disengaged position.
Figure 14:
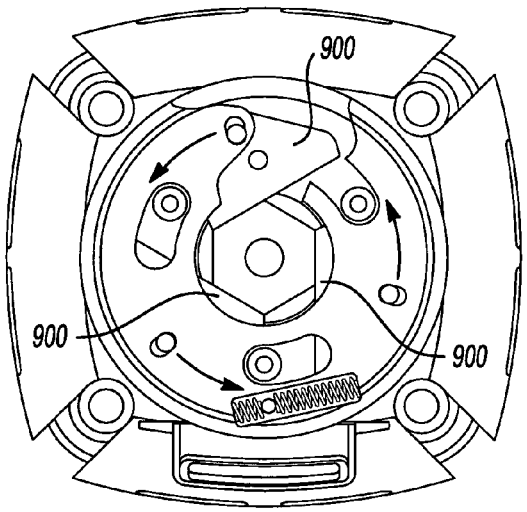
FIG. 14 is a schematic front view of the tool free collet assembly of FIG. 13 in a collet loosening position.
Figure 15:
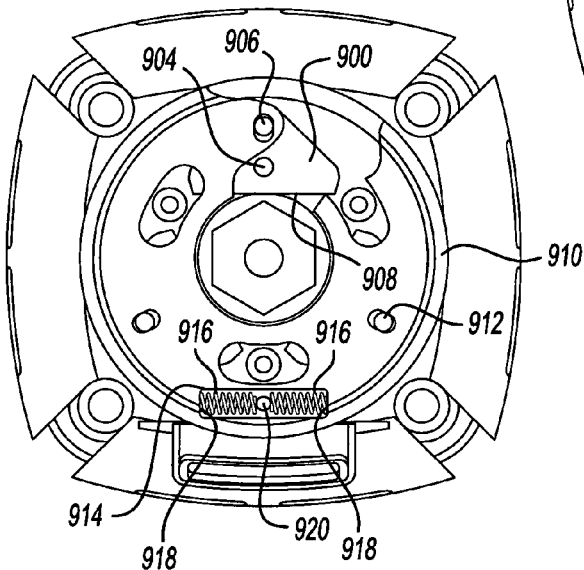
FIG. 15 is a schematic front view of the tool free collet assembly of FIG. 13 in a collet tightening position.

Turning now to FIGS. 13-15, another embodiment is illustrated having three wrench plates 900 pivotally mounted to a collet grip base 902 via pivot pins 904. Each of the three wrench plates 900 includes a cam pin 906 extending therefrom and a gripping portion 908. A twist collar 910 includes cams 912 and a spring receiving portion 914. Each of the cams 912 is sized to receive the cam pin 906 of each wrench plate 900. Each of the cams 912 is further shaped to pivotally drive each of the wrench plates 900 about pivot pins 904 between the disengaged position (see FIG. 13), the collet loosening position (see FIG. 14), and the collet tightening position (see FIG. 15) as twist collar 910 is rotated relative to collet grip base 902.

Still referring to FIGS. 13-15, wrench springs 916 are disposed in the spring receiving portion 914 of twist collar 910, such that each engages a wall 918 formed in the twist collar 910 on one end and a side of a mount 920 on the other end. This arrangement serves to center the twist collar 910 relative to collet grip base 902 and thus return the wrench plates 900 to their disengaged position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power tool comprising:
    a housing;
    a motor within the housing;
    a power source coupled with the motor;
    an output member drivingly connected to the motor;
    an activation member coupled with the power source and the motor for selectively applying power to the motor; and
    a collet assembly coupled with the output member, the collet assembly including:
        a collet nut rotatably connected to the output member;
        a collet operatively connected to the collet nut;
        a collet grip base rotatably coupled to the housing;
        a twist collar rotatably coupled to the collet grip base for rotation relative thereto, said twist collar having a pair of cams formed therein; and
        at least two collet wrenches each having a pivot end pivotally coupled to said collet grip base, a gripping portion selectively engagable with said collet nut for applying a torque thereto, and a cam follower extending therefrom and cammingly engaging a corresponding one of said pair of cams of said twist collar.

2. The power tool according to claim 1 wherein each of said at least two collet wrenches is positionable in a disengaged position where said gripping portion is spaced apart from said collet nut where said collet nut can freely rotate relative to said at least two collet wrenches and an engaged position where said gripping portion engages said collet nut to prevent rotation of said collet nut relative to said at least two collet wrenches.

3. The power tool according to claim 2 wherein said at least two collet wrenches are positionable between said disengaged position and said engaged position in response to said twist collar being rotated relative to said collet grip base causing said cam follower of each of said at least two collet wrenches to slide along said pair of cams of said twist collar thereby pivoting each of said at least two collet wrenches about said pivot end.

4. The power tool according to claim 3 wherein said pair of cams of said twist collar are cam slots formed in said twist collar and said cam follower of said at least two collet wrenches is a cam pin that is slidably received within said cam slots.

5. The power tool according to claim 4 wherein said engaged position further defines a collet tightening engaged position and a collet loosening engaged position and said cam slots comprise a first portion shaped such that said cam followers slides within said first portion of said cam slots to position said at least two collet wrenches in said collet tightening engaged position and a second portion shaped such that said cam follower slides within said second portion of said cam slots to position said at least two collet wrenches in said collet loosening engaged position.

6. The power tool according to claim 2, further comprising:
   means for biasing said at least two collet wrenches in said disengaged position.

7. The power tool according to claim 1 wherein said twist collar comprises a textured surface collet grip to aid in application of sufficient torque thereto.

8. A power tool comprising:
   a housing;
   a motor within the housing;
   a power source coupled with the motor;
   an output member drivingly connected to the motor;
   an activation member coupled with the power source and the motor for selectively applying power to the motor; and
   a collet assembly coupled with the output member, the collet assembly including:
      a collet nut rotatably connected to the output member;
      a collet operatively connected to the collet nut;
      a collet grip base rotatably coupled to the housing;
      a twist collar rotatably coupled to the collet grip base for rotation relative thereto, said twist collar having a pair of cams formed therein; and
      at least two collet wrenches each having a gripping portion selectively engagable with said collet nut for applying a torque thereto and a cam follower extending therefrom and cammingly engaging a corresponding one of said pair of cams of said twist collar, said at least two collect wrenches being slidably disposed between said twist collar and said collet grip base.

9. The power tool according to claim 8 wherein each of said at least two collet wrenches is positionable in a disengaged position where said gripping portion is spaced apart from said collet nut where said collet nut can freely rotate relative to said at least two collet wrenches and an engaged position where said gripping portion engages said collet nut to prevent rotation of said collet nut relative to said at least two collet wrenches.

10. The power tool according to claim 9 wherein said at least two collet wrenches are positionable between said disengaged position and said engaged position in response to said twist collar being rotated relative to said collet grip base causing said cam follower of each of said at least two collet wrenches to slide along said pair of cams of said twist collar thereby sliding each of said at least two collet wrenches toward the other.

11. The power tool according to claim 10 wherein said pair of cams of said twist collar are cam surfaces formed in said twist collar and said cam follower of said at least two collet wrenches slidably engages said cam surfaces.

12. The power tool according to claim 11 wherein said engaged position further defines a collet tightening engaged position and a collet loosening engaged position and said cam surfaces comprise a first portion shaped such that said cam followers slides along said first portion of said cam surfaces to position said at least two collet wrenches in said collet tightening engaged position and a second portion shaped such that said cam follower slides along said second portion of said cam surfaces to position said at least two collet wrenches in said collet loosening engaged position.

13. The power tool according to claim 9, further comprising:
   means for biasing said at least two collet wrenches in said disengaged position.

14. The power tool according to claim 8 wherein said twist collar comprises a textured surface collet grip to aid in application of sufficient torque thereto.

* * * * *